United States Patent
Lunttila et al.

(10) Patent No.: US 9,986,543 B2
(45) Date of Patent: *May 29, 2018

(54) ALLOCATION OF COMMUNICATION RESOURCES

(71) Applicant: Nokia Solutions and Networks Oy, Espoo (FI)

(72) Inventors: Timo Erkki Lunttila, Espoo (FI); Esa Tapani Tiirola, Kempele (FI); Frank Frederiksen, Klarup (DK)

(73) Assignee: Nokia Solutions and Networks Oy, Espoo (FI)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/457,115

(22) Filed: Mar. 13, 2017

(65) Prior Publication Data
US 2017/0215180 A1    Jul. 27, 2017

Related U.S. Application Data

(63) Continuation of application No. 15/359,665, filed on Nov. 23, 2016, now Pat. No. 9,693,344, which is a (Continued)

(30) Foreign Application Priority Data
Mar. 2, 2012 (WO) .................. PCT/EP2012/053621

(51) Int. Cl.
*H04W 72/04* (2009.01)
*H04L 5/00* (2006.01)
(Continued)

(52) U.S. Cl.
CPC ....... *H04W 72/0413* (2013.01); *H04L 1/1861* (2013.01); *H04L 1/1864* (2013.01);
(Continued)

(58) Field of Classification Search
CPC ... H04L 5/0053; H04L 5/0055; H04L 1/1861; H04L 5/0035; H04L 5/0058;
(Continued)

(56) References Cited

U.S. PATENT DOCUMENTS

2011/0081932 A1    4/2011  Astely et al.
2011/0243066 A1   10/2011  Nayeb Nazar
(Continued)

FOREIGN PATENT DOCUMENTS

CN    101505293 A    8/2009
RU    2419982 C2    1/2011
(Continued)

OTHER PUBLICATIONS

3GPP TS 36.212 V10.4.0, "$3^{rd}$ Generation Partnership Project; Technical Specification Group Radio Access Network; Evolved Universal Terrestrial Radio Access (E-UTRA); Multiplexing and channel coding (Release 10)"; Dec. 2011; Section 5.3.3.1.5C.
(Continued)

*Primary Examiner* — Ashley Shivers
(74) *Attorney, Agent, or Firm* — Harrington & Smith

(57) ABSTRACT

The disclosure relates to the allocation of resources for wireless communications. An index for an uplink control resource is determined in accordance with a predefined rule. The determining takes into account an index associated with a physical downlink resource and the amount of downlink resources to be mapped on the uplink control resource.

22 Claims, 4 Drawing Sheets

Related U.S. Application Data continuation of application No. 13/781,986, filed on Mar. 1, 2013, now Pat. No. 9,532,341.

(51) Int. Cl.
*H04W 72/06* (2009.01)
*H04L 1/18* (2006.01)

(52) U.S. Cl.
CPC .......... *H04L 5/0055* (2013.01); *H04L 5/0091* (2013.01); *H04W 72/042* (2013.01); *H04W 72/0493* (2013.01); *H04W 72/06* (2013.01)

(58) Field of Classification Search
CPC ............ H04L 25/03866; H04W 72/04; H04W 72/0466; H04W 72/0493; H04W 88/06; H04W 72/0413
See application file for complete search history.

(56) References Cited

U.S. PATENT DOCUMENTS

| | | |
|---|---|---|
| 2011/0299490 A1 | 12/2011 | Nordstrom et al. |
| 2012/0057449 A1 | 3/2012 | Takaoka |
| 2013/0064196 A1 | 3/2013 | Gao et al. |
| 2013/0114530 A1* | 5/2013 | Chen ................... H04W 72/042 370/329 |
| 2014/0192757 A1 | 7/2014 | Lee et al. |

FOREIGN PATENT DOCUMENTS

| | | |
|---|---|---|
| RU | 2428814 C1 | 6/2011 |
| WO | WO-2009/120888 A2 | 10/2009 |
| WO | WO-2013/062238 A1 | 5/2013 |

OTHER PUBLICATIONS

NEC Group, TSG-RAN WG1#50bis, R1-074163, "Downlink ACK/NACK signaling for E-UTRA"; Oct. 8-12, 2007; whole document; Shanghai, China.
R1-120113; Catt, "PUCCH resource for E-PDCCH"; 3GPP TSG RAN WG1 Meeting #68; Dresden, Germany Feb. 6-10, 2012.
R1-120329; Pantech; PUCCH resource allocation for E-PDCCH; 3GPP TSG RAN1 #68; Dresden, Germany, Feb. 6-10, 2012.
R1-114066; Alcatel-Lucent Shanghai Bell, Alcatel-Lucent; 3GPP TSG RAN WG1 Meeting #67 San Francisco, USA, Nov. 14-18, 2011; PUCCH resource mapping with ePDCCH.

* cited by examiner

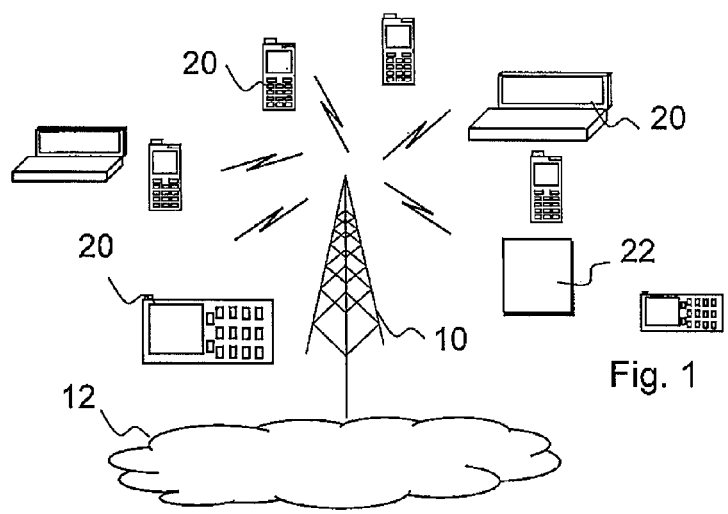
Fig. 1
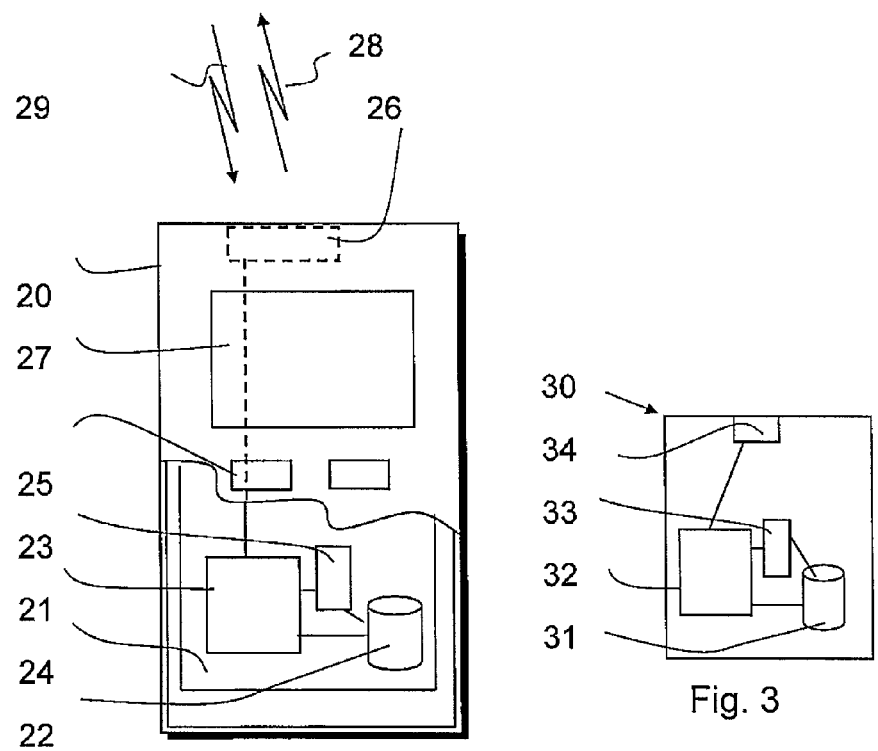
Fig. 2
Fig. 3

TABLE 1

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}=0$ | 0 | 2 layers, ports 7-8, $n_{SCID}=0$ |
| 1 | 1 layer, port 7, $n_{SCID}=1$ | 1 | 2 layers, ports 7-8, $n_{SCID}=1$ |
| 2 | 1 layer, port 8, $n_{SCID}=0$ | 2 | 3 layers, ports 7-9 |
| 3 | 1 layer, port 8, $n_{SCID}=1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Fig. 6

TABLE 2

| Offset | Lowest antenna port | nSCID |
|---|---|---|
| 0 | 7 | 0 |
| 1 | 8 | 1 |
| 2 | 7 | 1 |
| 3 | 8 | 0 |

Fig. 7

TABLE 3A

| PRB_1st | offset | granularity =1/4 | |
|---|---|---|---|
| 0 | 0 | 1 | 2 |
| 1 | 0 | 1 | 2 |
| 2 | 0 | 1 | 2 |
| 3 | 0 | 1 | 2 |
| 4 | 1 | 2 | 3 |
| 5 | 1 | 2 | 3 |
| 6 | 1 | 2 | 3 |
| 7 | 1 | 2 | 3 |
| 8 | 2 | 3 | 4 |
| 9 | 2 | 3 | 4 |
| 10 | 2 | 3 | 4 |
| 11 | 2 | 3 | 4 |
| 12 | 3 | 4 | 5 |
| 13 | 3 | 4 | 5 |
| 14 | 3 | 4 | 5 |
| 15 | 3 | 4 | 5 |
| 16 | 4 | 5 | 6 |
| 17 | 4 | 5 | 6 |
| 18 | 4 | 5 | 6 |
| 19 | 4 | 5 | 6 |
| 20 | 5 | 6 | 7 |
| 21 | 5 | 6 | 7 |
| 22 | 5 | 6 | 7 |
| 23 | 5 | 6 | 7 |
| 24 | 6 | 7 | 8 |

TABLE 3B

| PRB_1st | offset | granularity =2 | |
|---|---|---|---|
| 0 | 0 | 1 | 2 |
| 1 | 0 | 1 | 3 |
| 2 | 2 | 3 | 4 |
| 3 | 4 | 5 | 6 |
| 4 | 6 | 7 | 8 |
| 5 | 8 | 9 | 10 |
| 6 | 10 | 11 | 12 |
| 7 | 12 | 13 | 14 |
| 8 | 14 | 15 | 16 |
| 9 | 16 | 17 | 18 |
| 10 | 18 | 19 | 20 |
| 11 | 20 | 21 | 22 |
| 12 | 22 | 23 | 24 |
| 13 | 24 | 25 | 26 |
| 14 | 26 | 27 | 28 |
| 15 | 28 | 29 | 30 |
| 16 | 30 | 31 | 32 |
| 17 | 32 | 33 | 34 |
| 18 | 34 | 35 | 36 |
| 19 | 36 | 37 | 38 |
| 20 | 38 | 39 | 40 |
| 21 | 40 | 41 | 42 |
| 22 | 42 | 43 | 44 |
| 23 | 44 | 45 | 46 |
| 24 | 46 | 47 | 48 |
| | 48 | 49 | 50 |
| | | | 51 |

Fig. 8

ALLOCATION OF COMMUNICATION RESOURCES

CROSS-REFERENCE TO RELATED APPLICATION

This application is a continuation of U.S. patent application Ser. No. 15/359,665, filed Nov. 23, 2016, now U.S. Pat. No. 9,693,344, which is a continuation of U.S. patent application Ser. No. 13/781,986, filed Mar. 1, 2013, now U.S. Pat. No. 9,532,341.

BACKGROUND OF THE INVENTION (1) Field of the Invention

This disclosure relates to allocation of resources for communications and more particularly but not explicitly to allocation of resources for uplink control signals for wireless communications.

(2) Description of Related Art

A communication system can be seen as a facility that enables communication sessions between two or more nodes such as fixed or mobile devices, machine-type terminals, access nodes such as base stations, servers and so on. A communication system and compatible communicating entities typically operate in accordance with a given standard or specification which sets out what the various entities associated with the system are permitted to do and how that should be achieved. For example, the standards, specifications and related protocols can define the manner how devices shall communicate, how various aspects of communications shall be implemented and how devices for use in the system shall be configured.

Users can access the communication system by means of appropriate communication devices. A communication device of a user is often referred to as user equipment (UE) or terminal. A communication device is provided with an appropriate signal receiving and transmitting arrangement for enabling communications with other parties. Typically a device such as user equipment is used for enabling receiving and transmission of communications such as speech and content data.

Communications can be carried on wireless carriers. Examples of wireless systems include public land mobile networks (PLMN) such as cellular networks, satellite based communication systems and different wireless local networks, for example wireless local area networks (WLAN). In wireless systems a communication device provides a transceiver station that can communicate with another communication device such as e.g. a base station of an access network and/or other user equipment. The two directions of communications between a base station and communication devices of users have been conventionally referred to as downlink and uplink. Downlink (DL) can be understood as the direction from the base station and uplink (UL) the direction to the base station.

Various control information may need to be signalled between the parties. Control information is typically communicated on control channels, for example on physical uplink control channel (PUCCH) or physical downlink control channel (PDCCH). For example, information relating to resource may need to be signalled between stations. Allocation of resources for the downlink and the uplink can be handled independently. Uplink (UL) assignments or grants sent to a user equipment (UE) are used to inform the user equipment of resources the UE shall use to transmit data. Information when anything might be expected in the downlink may also be communicated from a base station. By means of the grants dynamic allocation of resources can be provided. Signalling of other types of control information is also needed. For example, a user equipment may need to signal feedback information on the uplink. Feedback information can be provided for the purposes of error detection and/or correction. Requests for retransmission of any information that the recipient node did not successfully receive are possible. For example, hybrid automatic repeat request (HARQ) error control mechanism may be used for this purpose. The error control mechanism can be implemented such that a transmitting device shall receive either a positive or a negative acknowledgement (ACK/NACK; A/N) or other indication regarding its transmission from a receiving device.

Increased utilization of advanced systems for various scenarios and different data traffic types increases the need to optimize the system further for a large number of users. A way to achieve this is to improve scheduling efficiency. In particular, reduction in scheduling overhead may be desired. It might be desired in certain applications to reduce downlink control signalling overhead caused by uplink and downlink scheduling. Optimization of signalling on physical downlink control channel (PDCCH) could be of particular advantage. For example, currently PUCCH resource allocation for PDSCH ACK/NACK is based on implicit mapping where the index of the lowest PDCCH Control Channel Element (CCE) determines directly the index of the PUCCH resource. Such "one-to-one" mapping provides a relatively efficient resource allocation scheme for a number of active UEs as dedicated ACK/NACK channels are not needed for each of them. Instead, the channels can share a common resource space which has the same size as the number of downlink CCEs. However, increased multiplexing of different users increases the number of possible downlink control channels. On particular, if different technologies, for example code division multiplexing (CDM) and frequency division multiplexing (FDM) are used, the number of possible downlink control channel candidates increases. This may be particularly the case with enhanced physical downlink control channels (ePDCCH). Furthermore, techniques such as multi-user multiple input multiple output (MU-MIMO) scheduling may be enabled for ePDCCH, and this in turn may increase the number of possible ePDCCH candidates in a cell, possibly up to several hundreds. In such situation one-to-one indexing of all the possible ePDCCH candidates could easily lead to an excessive number of ACK/NACK channels, and hence uplink overhead. Therefore there is a need for a more efficient indexing system for uplink control resource allocation, for example for PUCCH ACK/NACK resource allocation in case of ePDCCH scheduling such that collisions can be avoided.

It is noted that the above discussed issues are not limited to any particular communication environment and station apparatus, but may occur in any appropriate station apparatus where internal communications are required.

Embodiments of the invention aim to address one or several of the above issues.

SUMMARY OF THE INVENTION

In accordance with an embodiment there is provided an apparatus for allocation of resources for wireless communications, the apparatus comprising at least one processor, and at least one memory including computer program code, wherein the at least one memory and the computer program code are configured, with the at least one processor, to determine an index for a uplink control resource in accordance with a predefined rule, the determining taking into account an index associated with a physical downlink resource and the amount of downlink resources to be mapped on the uplink control resource.

According to another aspect, there is provided a method for allocation of resources for wireless communications, the method comprising determining an index for a uplink control resource in accordance with a predefined rule, the determining taking into account an index associated with a physical downlink resource and the amount of downlink resources to be mapped on the uplink control resource According to a more detailed aspect, the lowest index of the physical downlink resource block is taken into consideration.

The index associated with the physical downlink resource may comprise at least one of an index of an enhanced control channel element, an index of an enhanced physical downlink control channel and an index of a physical downlink shared channel scheduled by means of an enhanced physical downlink control channel.

An offset may be used in determining the index for the uplink control resource. At least one of an antenna port indicator and a scrambling identity may be used in in defining the offset. An offset parameter may be signalled in the downlink. The offset may be used for dynamic switching between at least two physical uplink control channel (PUCCH) format 1/1a/1b resources.

The amount of downlink resources is indicative of a number of downlink physical resource blocks that map to a physical uplink control channel resource.

Indications of the amount of downlink resources may be processed based on a configurable parameter. Information about the amount of downlink resources may be signalled in a user equipment specific or cell specific manner.

The downlink resource may comprise a physical downlink shared channel. Scheduling information for the physical downlink shared channel may be communicated by means of an enhanced physical downlink control channel. An index for a physical uplink control channel associate with the physical downlink shared channel may be determined. At least one index for signalling of automatic repeat request messages may be determined.

A final index for the uplink control resource may be defined by applying at least one further operation to an index determined based on an index associated with a physical downlink resource and the amount of downlink resources to be mapped on the uplink control resource.

A node such as a base station or a communication device of a user of machine type terminal can be configured to operate in accordance with the various embodiments.

A computer program comprising program code means adapted to perform the method may also be provided. The computer program may be stored and/or otherwise embodied by means of a carrier medium.

It should be appreciated that any feature of any aspect may be combined with any other feature of any other aspect.

DESCRIPTION OF THE SEVERAL VIEWS OF THE DRAWINGS

Embodiments will now be described in further detail, by way of example only, with reference to the following examples and accompanying drawings, in which:

FIG. 1 shows a schematic diagram of a communication system comprising a base station and a plurality of communication devices;

FIG. 2 shows a schematic diagram of a mobile communication device according to some embodiments;

FIG. 3 shows a schematic diagram of a control apparatus according to some embodiments;

FIGS. 6 to 8 show tables relating to parameters of particular examples.

DETAILED DESCRIPTION OF THE INVENTION

Figure 4:
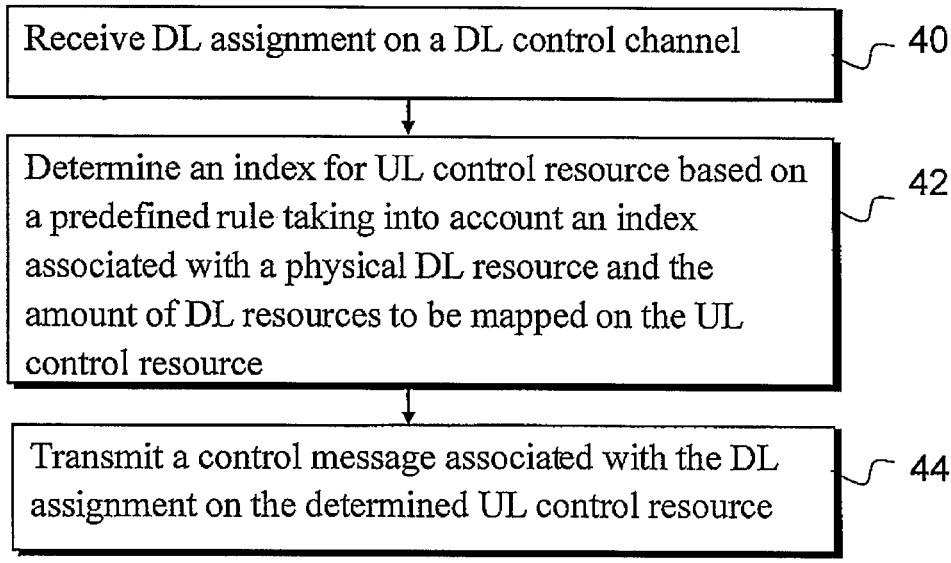
FIGS. 4 and 5 show flowcharts according to certain embodiments.

In the following certain exemplifying embodiments are explained with reference to a wireless or mobile communication system serving mobile communication devices. Before explaining in detail the exemplifying embodiments, certain general principles of a wireless communication system, access systems thereof, and mobile communication devices are briefly explained with reference to FIGS. 1 to 3 to assist in understanding the technology underlying the described examples.

An example of wireless communication systems are architectures standardized by the 3rd Generation Partnership Project (3GPP). A latest 3GPP based development is often referred to as the long-term evolution (LTE) of the Universal Mobile Telecommunications System (UMTS) radio-access technology. The various development stages of the 3GPP LTE specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

A device capable of wireless communications can communicate via at least one base station or similar wireless transmitter and/or receiver node. In FIG. 1 a base station 10 is shown to be serving various mobile devices 20 and a machine-like terminal 22. Base stations are typically controlled by at least one appropriate controller apparatus so as to enable operation thereof and management of mobile communication devices in communication with the base stations. The base station can be connected further to a broader communications system 12. It shall be understood that a number of neighbouring and/or overlapping access systems or radio service areas provided by a number of base stations may exist. A base station site can provide one or more cells or sectors, each sector providing a cell or a subarea of a cell. Each device and base station may have one or more radio channels open at the same time and may send signals to and/or receive signals from one or more sources. As a plurality of devices can use the same wireless resource, transmissions thereof need to be scheduled to avoid collisions and/or interference.

A possible mobile communication device for transmitting in uplink and receiving in downlink will now be described in more detail with reference to FIG. 2 showing a schematic, partially sectioned view of a communication device 20. Such a communication device is often referred to as user equipment (UE) or terminal. An appropriate communication device may be provided by any device capable of sending radio signals to and/or receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Non-limiting examples of content data include downloads, television and radio programs, videos, advertisements, various alerts and other information.

The device 20 is configured to receive signals in the downlink 29 over an air interface via appropriate apparatus for receiving and to transmit signals in the uplink 28 via appropriate apparatus for transmitting radio signals. In FIG. 2 the transceiver apparatus is designated schematically by block 26. The transceiver apparatus 26 may be provided for example by means of a radio part and associated antenna arrangement. The antenna arrangement may be arranged internally or externally to the mobile device.

A mobile communication device is also provided with at least one data processing entity 21, at least one memory 22 and other possible components 23 for use in software and hardware aided execution of tasks it is designed to perform, including control of access to and communications with base stations and/or other communication devices. The data processing, storage and other relevant apparatus can be provided on an appropriate circuit board and/or in chipsets. This apparatus is denoted by reference 24.

The user may control the operation of the mobile device by means of a suitable user interface such as key pad 25, voice commands, touch sensitive screen or pad, combinations thereof or the like. A display 27, a speaker and a microphone can be also provided. Furthermore, a communication device may comprise appropriate connectors (either wired or wireless) to other devices and/or for connecting external accessories, for example hands-free equipment, thereto.

FIG. 3 shows an example of a control apparatus 30 for a communication system, for example to be coupled to and/or for controlling a base station. In some embodiments a base station may comprise an integrated control apparatus and some other embodiments the control apparatus can be provided by a separate network element. The control apparatus can be interconnected with other control entities. The control apparatus and functions may be distributed between a plurality of control units. In some embodiments each base station can comprise a control apparatus. In alternative embodiments, two or more base stations may share a control apparatus. The arrangement of the control depends on the standard, and for example in accordance with the current LTE specifications no separate radio network controller is provided. Regardless the location, the control apparatus 30 can be understood as providing control on communications in the service area of at least one base station. The control apparatus 30 can be configured to provide control functions in association with scheduling of uplink in accordance with embodiments described below. For this purpose the control apparatus can comprise at least one memory 31, at least one data processing unit 32, 33 and an input/output interface 34. Via the interface the control apparatus can be coupled to a base station to cause operation of the base station in accordance with the below described embodiments. The control apparatus can be configured to execute an appropriate software code to provide the control functions.

A wireless communication device, such as a mobile device, machine-like terminal or a base station, can be provided with a Multiple Input/Multiple Output (MIMO) antenna system. MIMO arrangements as such are known. MIMO systems use multiple antennas at the transmitter and receiver along with advanced digital signal processing to improve link quality and capacity. For example, the transceiver apparatus 26 of FIG. 2 can provide a plurality of antenna ports. More data can be received and/or sent where there are more antennae elements.

In accordance with an embodiment an implicit indexing scheme for uplink control channels resources is provided. A method of providing uplink (UL) indices in an user equipment is illustrated by the flowchart of FIG. 4. A downlink (DL) assignment of resources for wireless communications by at least one user equipment as allocated by a network element, for example an eNB, is received at 40. Thus information about scheduled downlink resources is provided on a physical downlink control resource for the user equipment at this stage. An index for uplink control resource in accordance with a predefined rule can be determined at 42. The determining takes into account an index associated with a physical downlink resource and the amount of downlink resources to be mapped on the uplink control resource. A control message associated with the DL assignment can then be transmitted at 44 on the determined resource.

In accordance with an embodiment the downlink index associates with an enhanced physical downlink control channel (ePDCCH) or a physical downlink shared channel (PDSCH) scheduled by means of an enhanced physical downlink control channel. The index may be the lowest index of the physical downlink resource block. According to a possibility the index comprises the lowest index of an enhanced control channel element. The control message may comprise ACK/NACK for the PDSCH on a determined physical uplink control channel (PUCCH) resource.

An offset may be used at 42 in determining the index of the uplink control resource to avoid collisions. The offset can be used to enable dynamic switching between different PUCCH format 1/1a/1b resources by means of the offset. Thus the offset can be used to select an appropriate resource among the available resource sets.

Figure 5:
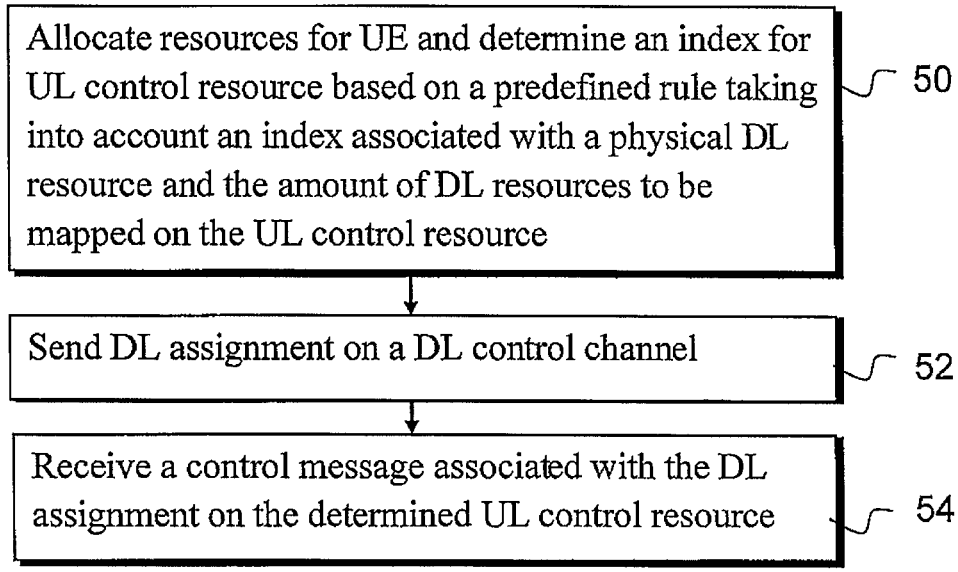

FIG. 5 illustrates the operation at the network side. An appropriate controller, for example an eNodeB (eNB) determines the UL resource so that it knows on which resource to receive the control messages. The eNodeB can perform this for example when it allocates DL resources, for example ePDCCH and PDSCH resources, at 50. The DL assignment can then be sent at 52. The network element can expect to receive the control messages at 54 in accordance with the predefined rule.

In accordance with an example HARQ resources can be allocated on a physical uplink control channel (PUCCH) when enhanced physical downlink control channel (ePDCCH) is used to schedule downlink data on a physical downlink shared channel (PDSCH). ePDCCH is a recent development of the LTE and is designed to improve control channel performance.

ePDCCH may be in particular useful in connection with arrangements such as coordinated multipoint (CoMP), DL MIMO, heterogeneous networks (HetNet) and carrier aggregation, including use of extension carriers. For example, ePDCCH may be used to provide support for increased control channel capacity, support for frequency-domain interference control and interference coordination (ICIC), improved spatial reuse of control channel resources, support for beamforming and/or diversity, support for operation on new carrier types and in Multicast Broadcast Single Frequency Network (MBSFN) subframes, capability to coexist on the same carrier as legacy user equipment, ability to be scheduled frequency-selectively, ability to mitigate inter-cell interference and so on.

By means of an implicit mapping rule an index for the uplink control resource can be derived based on the index of a relevant downlink channel. The rule does not need to consider the exact PUCCH resource the relevant control message associated with the downlink shall map to. By means of the embodiment many-to-one implicit indexing can be provided and collisions of indices may be avoided in the case of multiuser arrangements such as MU-MIMO. The many-to-one mapping from downlink resource blocks to the uplink channel may be configurable.

In accordance with an embodiment where ePDCCH is used to schedule downlink data on PDSCH uplink control channel resource(s) for the feedback mechanism are provided in response to a received PDSCH. More particularly, indexing of ePDCCH resources for supporting implicit resource allocation for HARQ ACK/NACK is provided. An implicit resource allocation rule can be provided for the HARQ-ACK resources corresponding to PDSCH scheduled via ePDCCH.

In the example below a new uplink index parameter, denoted as $n_{ePDCCH \rightarrow PUCCH}^{(1)}$, is defined. The exemplifying index parameter corresponds to a PUCCH Format 1/1a/1b channel. The parameters that may be used to determine $n_{ePDCCH \rightarrow PUCCH}^{(1)}$ include physical resource block (PRB) compression factor (granularity). This parameter can be used to define the number of PUCCH resources per DL PRB, i.e. how many DL ePDCCH or PDSCH PRBs map to a single PUCCH resource. The physical resource block can be consecutive. Physical resource block (PRB) compression factor provides a many-to-one mapping between the scheduled DL resource (ePDCCH or PDSCH) and the PUCCH resource used for HARQ-ACK transmission and allows to adjust the number of PUCCH resources reserved to PDSCH scheduled via ePDCCH.

Instead of a physical resource block, the compression by mapping a number of DL resources in a lesser number of UL resources may also be done similarly e.g. with respect to enhanced control channel elements (eCCEs).

An offset parameter can also be used to define a dynamic offset for the PUCCH Format 1/1a/1b resource domain. The offset parameter can be used to allow facilitation of dynamic switching among plurality of PUCCH Format 1/1a/1b channels to avoid $n_{ePDCCH \rightarrow PUCCH}^{(1)}$ collisions caused by PRB compression. This can be particularly the case in many-to-one mapping and e.g. MU-MIMO scheduling. In accordance with a possible resource allocation scheme the existing parameters, namely antenna port indicator and scrambling identity (nSCID) are used as parameters to define the offset. According to a possibility an explicit value indicated in the downlink control information (DCI) may be used in defining the offset. This provides eNBs with the option of making a simple shift to avoid collisions in the uplink control channel domain. Existing parameters and the explicit offset indication can also be used in combination in defining the offset.

As an example, antenna port and scrambling identity (nSCID) for LTE as defined by Table 5.3.3.1.5C-1 of 3GPP Technical Specification (TS) 36.212, is reproduced in Table 1 in FIG. 6.

The existing signaling can be reused as such to avoid $n_{ePDCCH \rightarrow PUCCH}^{(1)}$ collisions due to MU-MIMO. In the case of MU-MIMO scheduling eNB can make e.g. the following MU-MIMO pairing:

the first UE: 1 layer port 7, nscid=0
the second UL: 1 layer port 8, nscid=1

Table 2 of FIG. 7 shows how different combinations of lowest antenna port and scrambling identity parameters selectable by an eNB each can give a different offset parameter. Thus different PUCCH resources can be occupied by defining the offset based on the existing parameters.

An example of an index associated with the physical downlink resource is a parameter defining the lowest PRB index of ePDCCH or a PDSCH scheduled via ePDCCH.

A specific mapping rule can be defined for many-to-one mapping between the input parameter and the PUCCH format 1a/1b channel. In accordance with an example the mapping can be defined as:

$$n_{ePDCCH \rightarrow PUCCH}^{(1)} = \lfloor PRB\ 1st \times granulalarity \rfloor + offset$$

where:
$\lfloor\ \rfloor$ is a floor operation,
PRB_1st is the index of the lowest PDSCH or ePDCCH PRB when PDSCH is scheduled via ePDCCH,
granularity is a parameter defining the number DL PRBs mapping to a single PUCCH resource, and
offset is an offset parameter which depends on the lowest antenna port and scrambling identity according to Table 2, see FIG. 7.

Instead of physical resource blocks, other resources, for example enhanced control channel element, may be used as a base for the indexing.

It is noted that a given resource index ($n_{ePDCCH \rightarrow PUCCH}^{(1)}$) may be subject to further mathematical operations to define the final index for PUCCH Format 1/1a/1b channel. These may include operations such as addition of semi-static offset (this allows to shift ePDCCH resources within the existing PUCCH Format 1/1a/1b resource space) and further dynamic modifier such as ARI (ACK/NACK resource index) included in the DCI, allowing the eNB to select one out N resources available.

The granularity is a configurable parameter. In accordance with an embodiment granularity parameter is configured via radio resource control (RRC) signalling either in cell-specific manner or in UE-specific manner. Currently values [1, 2, ½, ¼, etc.] are considered appropriate for the granularity parameter, but other values may also be considered. The granularity parameter can be understood as the spacing in terms of PUCCH resources derived based on two consecutive DL PRBs (either ePDCCH or PDSCH). A granularity value <1 implies many-to-one mapping (compression), i.e. several DL PRBs map to a single PUCCH resource.

Tables 3A and 3B in FIG. 8 shows two examples for $n_{ePDCCH \rightarrow PUCCH}^{(1)}$ mapping as a function of PRB_$1^{st}$ and offset. In the first example of Table 3A granularity parameter is set to ¼ and the offset for different PRB $1^{st}$ values varies from 0 to 4. This results uplink index values from 0 to 9. In the second example of Table 3B granularity is set to 2, the offset varying from 0 to 4. In this example uplink indices vary from 0 to 51.

The embodiments may provide a scalable solution for the PUCCH resource dimensioning. This can be used to allow to trade-off between scheduler flexibility and PUCCH overhead. Existing parameters such as antenna port and scrambling indicator can be utilised in handling a MU-MIMO scenario. In a particular embodiment ePDCCH scheduling (e.g. search space and link adaptation) can be kept independent from PUCCH resource allocation. This can simplify the scheduler operation. It is also an advantage that the same A/N resource pool can be used for PUCCH HARQ ACK/NACKs for legacy user equipment and ePDCCH enabled user equipment.

It is noted that whilst embodiments have been described in relation to LTE, similar principles can be applied to any other communication system or to further developments with LTE. Also, instead of scheduling that is provided by a control apparatus associated with a base station scheduling may be provided by any apparatus for scheduling transmissions in two directions between at least two devices. Thus, although the embodiments are described with references to uplink and downlink, these terms should not be understood as limiting as the disclosure is not limited by the directions between a base station and a user terminal. Instead, the invention is applicable to any system where a control apparatus can schedule transmissions between two or more communicating entities, wherein the scheduling entity can be seen as being in the "upper" end of the link. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions of a base station apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. An apparatus comprising:
   at least one processor; and
   at least one memory including computer program code, wherein the at least one memory and the computer program code are configured, with the at least one processor, to:
   receive, from a network element on an enhanced physical downlink control channel (ePDCCH), a message comprising a downlink resource assignment;
   determine, from the message received on the ePDCCH, an index for an uplink control resource by applying, on the downlink resource assignment, a many-to-one index mapping between scheduled downlink resources to a single uplink control resource taking into account an index associated with a physical downlink resource; and
   transmit, to the network element, a control message associated with the downlink resource assignment, on the determined uplink control resource.

2. An apparatus according to claim 1, configured to take into account the lowest index of a physical downlink resource block or a control channel element for the ePDCCH in determining the index for the uplink control resource.

3. An apparatus according to claim 1, wherein the index associated with the physical downlink resource comprises the index of at least one of an enhanced control channel element, an enhanced physical downlink control channel and a physical downlink shared channel scheduled by means of an enhanced physical downlink control channel.

4. An apparatus according to claim 1, configured to take into account an offset in uplink control resources, wherein at least one of an antenna port indicator and a scrambling identity is used in defining the offset.

5. An apparatus according to claim 1, configured to receive signaling of an offset parameter in the downlink, or to receive information about the many-to-one index mapping that are signaled in a user equipment specific or cell specific manner.

6. An apparatus according to claim 1, configured to use an offset in uplink control resources for dynamic switching between at least two physical uplink control channel (PUCCH) format 1/1a/1b resources.

7. An apparatus according to claim 1, wherein the many-to-one index mapping is indicative of a number of downlink physical resources that map to the uplink control channel resource.

8. An apparatus according to claim 1, wherein the physical downlink resource comprises a physical downlink shared channel, the apparatus being configured to communicate scheduling information for the physical downlink shared channel by means of an enhanced physical downlink control channel and to determine an index for a physical uplink control channel associated with the physical downlink shared channel.

9. An apparatus according to claim 1, configured to determine at least one index for signalling of automatic repeat request messages.

10. An apparatus comprising:
at least one processor; and
at least one memory including computer program code, wherein the at least one memory and the computer program code are configured, with the at least one processor, to:
send, on an enhanced physical downlink control channel (ePDCCH) to a user equipment, a message comprising a downlink resource assignment, wherein the message is indicative of a many-to-one index mapping between scheduled downlink resources to a single uplink control resource, an index for an uplink control resource for the user equipment being determined by applying the many-to-one index mapping on the downlink resource assignment taking into account an index associated with a physical downlink resource; and
receive, from the user equipment on the determined uplink control resource, information associated with the downlink resource assignment.

11. An apparatus according to claim 10, wherein the lowest index of a physical downlink resource block or a control channel element for the ePDCCH is considered in determining the index for the uplink control resource.

12. An apparatus according to claim 10, wherein the index associated with the physical downlink resource comprises the index of at least one of an enhanced control channel element, an enhanced physical downlink control channel and a physical downlink shared channel scheduled by means of an enhanced physical downlink control channel.

13. An apparatus according to claim 10, configured to use at least one of an antenna port indicator and a scrambling identity in defining an offset in uplink control channel resources, wherein the index for the uplink control resource is based on the offset.

14. An apparatus according to claim 10, configured to signal an offset parameter in the downlink, or to signal information about the many-to-one index mapping in a user equipment specific or cell specific manner.

15. An apparatus according to claim 10, wherein an offset in uplink control resources is used for dynamic switching between at least two physical uplink control channel (PUCCH) format 1/1a/1b resources.

16. An apparatus according to claim 10, wherein the many-to-one index mapping is indicative of a number of downlink physical resources that map to the uplink control channel resource.

17. An apparatus according to claim 10, wherein the physical downlink resource comprises a physical downlink shared channel, the apparatus being configured to communicate scheduling information for the physical downlink shared channel by means of an enhanced physical downlink control channel and to determine an index for a physical uplink control channel associated with the physical downlink shared channel.

18. An apparatus according to claim 10, wherein the received information comprises at least one index used for signalling of automatic repeat request messages.

19. A method comprising:
receiving, from a network element on an enhanced physical downlink control channel (ePDCCH), a message comprising a downlink resource assignment;
determining, from the message received on the ePDCCH, an index for an uplink control resource by applying, on the downlink resource assignment, a many-to-one index mapping between scheduled downlink resources to a single uplink control resource taking into account an index associated with a physical downlink resource; and
transmitting, to the network element, a control message associated with the downlink resource assignment, on the determined uplink control resource.

20. A method comprising:
sending, on an enhanced physical downlink control channel (ePDCCH) to a user equipment, a message comprising a downlink resource assignment, wherein the message is indicative of a many-to-one index mapping between scheduled downlink resources to a single uplink control resource, an index for an uplink control resource for the user equipment being determined by applying the many-to-one index mapping on the downlink resource assignment taking into account an index associated with a physical downlink resource; and
receiving, from the user equipment on the determined uplink control resource, information associated with the downlink resource assignment.

21. A non-transitory computer-readable storage medium bearing a computer program embodied therein for use with a computer, the computer program comprising code means adapted to perform the steps of claim 19 when the computer program is run on processor apparatus.

22. A non-transitory computer-readable storage medium bearing a computer program embodied therein for use with a computer, the computer program comprising code means adapted to perform the steps of claim 20 when the computer program is run on processor apparatus.

* * * * *